(12) United States Patent
Ziser et al.

(10) Patent No.: US 8,592,512 B2
(45) Date of Patent: Nov. 26, 2013

(54) CARBON NANOTUBES AND ORGANIC MEDIA CONTAINING MICROGELS

(75) Inventors: Torsten Ziser, Weinheim (DE); Thomas Früh, Mutterstadt (DE); Werner Obrecht, Moers (DE); Reiner Rudolf, Langenfeld (DE); Sigurd Buchholz, Köln (DE); Volker Michele, Köln (DE); Leslaw Mleczko, Dormagen (DE); Christian Münnich, Leverkusen (DE); Aurel Wolf, Wülfrath (DE); Daniel Gordon Duff, Leverkusen (DE)

(73) Assignees: Lanxess Deutschland GmbH, Leverkusen (DE); Bayer MaterialScience AG, Leverkusen (DE)

( * ) Notice: Subject to any disclaimer, the term of this patent is extended or adjusted under 35 U.S.C. 154(b) by 64 days.

(21) Appl. No.: 12/994,116

(22) PCT Filed: May 20, 2009

(86) PCT No.: PCT/EP2009/056165
§ 371 (c)(1),
(2), (4) Date: Feb. 25, 2011

(87) PCT Pub. No.: WO2009/141391
PCT Pub. Date: Nov. 26, 2009

(65) Prior Publication Data
US 2011/0224357 A1    Sep. 15, 2011

(30) Foreign Application Priority Data
May 23, 2008  (DE) .................. 10 2008 001 946

(51) Int. Cl.
*C08K 3/04*  (2006.01)
*C08L 75/00*  (2006.01)
(52) U.S. Cl.
USPC .......................................... 524/495; 524/507
(58) Field of Classification Search
USPC ........................................................ 524/495
See application file for complete search history.

(56) References Cited

U.S. PATENT DOCUMENTS

| | | | |
|---|---|---|---|
| 4,454,305 A | 6/1984 | Lindner et al. | |
| 5,013,793 A | 5/1991 | Wang et al. | |
| 5,124,408 A | 6/1992 | Engels et al. | |
| 5,238,977 A | 8/1993 | Piejko et al. | |
| 5,395,891 A | 3/1995 | Obrecht et al. | |
| 5,698,175 A * | 12/1997 | Hiura et al. ................. | 423/447.1 |
| 6,184,296 B1 | 2/2001 | Obrecht et al. | |
| 2003/0088036 A1 | 5/2003 | Huang et al. | |
| 2005/0182158 A1* | 8/2005 | Ziser et al. .................... | 523/223 |
| 2007/0191545 A1 | 8/2007 | Heiliger et al. | |
| 2007/0232733 A1 | 10/2007 | Ziser et al. | |
| 2008/0249241 A1 | 10/2008 | Heiliger et al. | |
| 2009/0200517 A1* | 8/2009 | El Bounia ..................... | 252/500 |

FOREIGN PATENT DOCUMENTS

| | | |
|---|---|---|
| CA | 1 156 778 A | 11/1983 |
| DE | 29 10 153 A1 | 9/1980 |
| DE | 29 10 168 A1 | 9/1980 |
| DE | 37 42 180 A1 | 6/1989 |
| DE | 42 20 563 A1 | 1/1994 |
| DE | 197 01 489 A1 | 7/1998 |
| DE | 103 45 043 A1 | 4/2005 |
| EP | 0 056 004 A2 | 7/1982 |
| EP | 0 205 556 A1 | 12/1986 |
| EP | 0 405 216 A1 | 1/1991 |
| EP | 0 854 171 A1 | 7/1998 |
| EP | 0 953 615 A2 | 11/1999 |
| EP | 1 262 510 A1 | 12/2002 |
| EP | 1 777 259 A1 | 4/2007 |
| EP | 1 845 124 A1 | 10/2007 |
| GB | 1078400 | 8/1967 |
| GB | 1 469 930 | 4/1977 |
| WO | 86/03455 A1 | 6/1986 |
| WO | 2005/033185 A1 | 4/2005 |
| WO | 2005/033186 A1 | 4/2005 |

OTHER PUBLICATIONS

International Search Report for PCT/EP2009/056165, dated Oct. 21, 2009.
Iijima, "Helical microtubules of graphitic carbon," Nature, vol. 354, pp. 56-58, Nov. 7, 1991.
International Preliminary Report on Patentability, dated Nov. 23, 2010, for Application No. PCT/EP2009/056165.
Liu et al., "Special Effect of Ultra-Fine Rubber Particles on Plastic Toughening," Chinese Journal of Polymer Science, vol. 20, No. 2, pp. 93-98, 2002.

* cited by examiner

*Primary Examiner* — Hui Chin
(74) *Attorney, Agent, or Firm* — Birch, Stewart, Kolasch & Birch, LLP

(57) ABSTRACT

The invention relates to a composition containing at least one microgel, at least one carbon nanotube and at least one organic medium. Said organic medium can be cross-linked or non cross-linked.

17 Claims, 1 Drawing Sheet

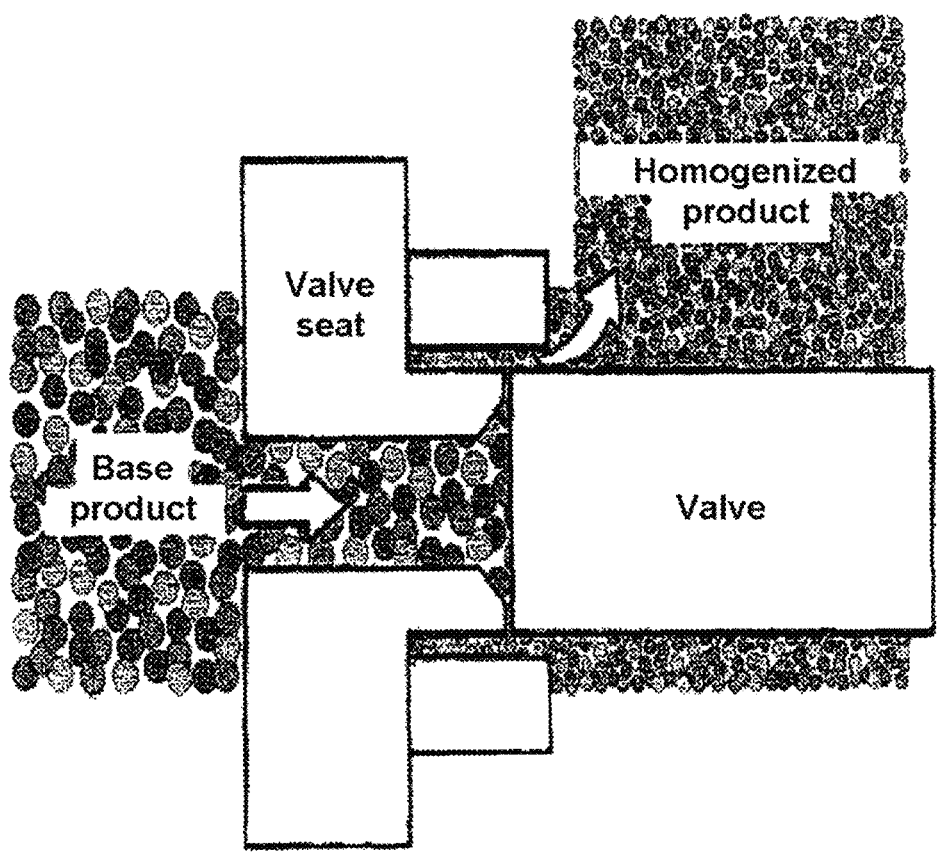

CARBON NANOTUBES AND ORGANIC MEDIA CONTAINING MICROGELS

The present invention relates to organic media comprising carbon nanotubes and microgels.

A known use of rubber gels, including modified rubber gels, is that in blends with a wide variety of different rubbers, in order, for example, to improve rolling resistance in the production of motor vehicle tires (see, for example, DE 42 20 563, GB-A 10 78 400, EP 405 216 and EP 854 171). The rubber gels here are always incorporated into solid matrices.

Also known is the incorporation of printing ink pigments in fine distribution in liquid media suitable therefor, in order ultimately to produce printing inks (see, for example, EP 0 953 615 A2, EP 0 953 615 A3). Particle sizes of down to 100 nm are achieved here.

For the dispersion, it is possible to use different dispersing units, such as bead mills, three-roll mills or homogenizers. The use of homogenizers and the way they work is described, for example, in the marketing bulletin of the APV Homogeniser Group "High-pressure homogenisers processes, product and applications" by William D. Pandolfe and Peder Baekgaard, principally for the homogenization of emulsions.

The documents cited do not describe the use of rubber gels as a solid component in mixtures with crosslinkable organic media of particular viscosity, with the aim of producing ultrafinely distributed rubber gel dispersions with particle diameters significantly below one µ, and the homogenization thereof by means of a homogenizer.

Chinese Journal of Polymer Science, Volume 20, No. 2, (2002), 93-98 describes microgels fully crosslinked by high-energy radiation, and the use thereof for increasing the impact resistance of plastics. In the preparation of specific epoxy resin compositions, an intermediate which occurs is a mixture of a radiation-crosslinked carboxyl end-stopped nitrile-butadiene microgel and the diglycidyl ether of bisphenol A. No further liquid microgel-containing compositions are described.

Similarly, US 2003/0088036 A1 discloses reinforced heat-curing resin compositions, the preparation of which likewise involves mixing radiation-crosslinked microgel particles with heat-curing prepolymers (see EP 1 262 510 A1).

In these publications, the preferred radiation source mentioned for production of the microgel particles is a radioactive cobalt source.

The use of radiation crosslinking gives very homogeneously crosslinked microgel particles. However, a particular disadvantage of this type of crosslinking is that scale-up of this process from the laboratory scale to an industrial scale plant is unrealistic both from an economic standpoint and considering occupational safety aspects. Microgels not crosslinked by high-energy radiation are not used in the publications cited. Moreover, when fully radiation-crosslinked microgels are used, the change in modulus from the matrix phase to the dispersed phase is immediate. In the event of abrupt stress, this can result in tearing effects between matrix and dispersed phase, which impairs the mechanical properties, the swelling behavior and stress-cracking corrosion, etc.

There are no pointers to the use of microgels not crosslinked by high-energy radiation in the publications cited.

DE 2 910 153 and DE 2 910 168 disclose dispersions of rubber particles with monomers. These are produced by admixing an aqueous rubber latex with the monomers with addition of a dispersant. These publications also mention the possibility of removing the water resulting from the latex. However, anhydrous dispersions are not described. Dispersions which are anhydrous cannot be obtained practically by this process (see also the acknowledgement in DE-A-3 742 180, page 2, line 10). However, this is disadvantageous in numerous applications. Moreover, the dispersions described in the patents cited necessarily comprise dispersants or emulsifiers in order to achieve homogeneous distribution of the aqueous and organic phases. However, the presence of such emulsifiers and dispersants is very troublesome in many applications. Moreover, the rubber particles described therein have relatively coarse particles.

WO 2005/033185 describes thermoplastic elastomer compositions which comprise at least one thermoplastic material and at least one microgel which has not been crosslinked by high-energy radiation and is based on homopolymers or random copolymers.

WO 2005/033186 states that it is possible to finely distribute microgels not crosslinked by high-energy radiation in crosslinkable organic media of particular viscosity, for example with a homogenizer. The division of the microgels in the crosslinkable organic medium down to the primary particle range is a prerequisite for utility, especially in a reproducible manner, of the nano properties of the microgels in a multitude of applications, for example in incorporation into plastics.

However, the compositions obtainable by this process do not have satisfactory rheological properties.

Carbon nanotubes (CNTs) are principally understood to mean cylindrical carbon tubes with a diameter between 3 and 80 nm; the length is several times, at least 100 times, the diameter. These tubes consist of layers of ordered carbon atoms and have a different core in terms of morphology. These carbon nanotubes are, for example, also referred to as "carbon fibrils" or "hollow carbon fibers". Owing to their dimensions and their particular properties, carbon nanotubes are of industrial significance for the production of composite materials. Important further possibilities lie in electronics applications, energy applications and further applications.

Carbon nanotubes are a material which has been known for some time. Even though Iijima in 1991 (S. Iijima, Nature 354, 56-58, 1991) is generally acknowledged as the discoverer of nanotubes, these materials, especially fibrous graphite materials having a plurality of graphite layers, have been known for longer. For example, as early as the 1970s and early 1980s, the deposition of very fine fibrous carbon from the catalytic decomposition of hydrocarbons was described (GB 1 469 930 A1 and EP 0 056 004 A2). However, the carbon filaments produced on the basis of short-chain hydrocarbons are not characterized in any more detail in relation to their diameter. The production of carbon nanotubes with diameters less than 100 nm is described, inter alia, also in EP 0 205 556 B1 and WO A 86/03455. For the production of the carbon nanotubes, the literature mentions, for example, light arc processes, laser ablation processes and catalytic processes. In the catalytic processes, it is possible to distinguish between deposition onto supported catalyst particles and deposition onto metal centers which are formed in situ and have diameters in the nanometer range (known as flow processes).

The use of carbon nanotubes as an additive in organic media, especially polymers, for enhancement of the mechanical, thermal and/or electrical properties of the polymers is known from a multitude of publications and patent applications. However, the combination of carbon nanotubes and microgels is not known to date.

The addition of soft microgels to liquid organic media which may be convertible to a plastic often leads to a significant increase in viscosity and a decline in the modulus of elasticity and in the hardness of the resulting plastic. The addition of CNTs to liquid organic media which may be convertible to a plastic often leads to a very significant increase in viscosity and to a reduction in tensile strain at break.

It was accordingly an object of the present invention to provide compositions which comprise microgels in organic media and which have improved mechanical and rheological properties compared to the known compositions comprising microgels and organic media.

It was another object of the present invention, proceeding from the prior art, to develop a composition consisting of crosslinkable and/or uncrosslinkable organic media, microgels and carbon nanotubes, in which the positive properties of the microgels, such as good tensile strain at break, and of the carbon nanotubes, such as high strength and electrical conductivity, are present in combination.

It was a further object of the present invention to provide a process for producing corresponding compositions.

The invention therefore provides for the development of suitable compositions (formulations) and of a process for optimal dispersion of microgels and carbon nanotubes in organic media. The division of the microgels and carbon nanotubes in the crosslinkable organic medium down to the primary particle range is, for example, a prerequisite for utility, especially in a reproducible manner, of the nano properties of the microgels and carbon nanotubes in all uses, for example in incorporation into plastics.

This object is achieved by a composition comprising at least one microgel (A), at least one carbon nanotube compound (B) and at least one organic medium (C).

It has been found that, surprisingly, by virtue of the addition of rubber-like microgel to a carbon nanotube compound, it is possible to increase or to improve the hardness, the modulus of elasticity E, the tensile strain at break $\epsilon_B$, the tensile stress at break $\sigma_B$ and the abrasion resistance, and to improve the flow properties at shear rates $\gamma$ of 0.2 $s^{-1}$, 5 $s^{-1}$ and 100 $s^{-1}$, even though the solids content is increased. Only at the very high shear rate $\gamma$ of 1000 $s^{-1}$ is the influence of the increased solids content manifested. By addition of microgel, it thus becomes possible to introduce higher CNT contents into liquid organic media than would be possible without microgel addition.

Microgel (A)

The microgel (A) used in the inventive composition is preferably a microgel not crosslinked by high-energy radiation. High-energy radiation here appropriately means electromagnetic radiation of a wavelength of less than 0.1 μm.

The use of microgels fully crosslinked homogeneously by high-energy radiation is disadvantageous because it is virtually impossible to perform on the industrial scale and presents problems with occupational safety.

Moreover, in compositions which have been produced using microgels fully crosslinked homogeneously by high-energy radiation, abrupt stress causes tearing effects between matrix and dispersed phase, which impair the mechanical properties, the swelling behavior and the stress-cracking corrosion, etc.

In a preferred embodiment of the invention, the primary particles of the microgel (A) have a virtually spherical geometry. According to DIN 53206:1992-08, primary particles refer to the microgel particles which are dispersed in the coherent phase and are identifiable as individual species by suitable physical methods (electron microscope) (cf., for example, Römpp Lexikon, Lacke and Druckfarben, Georg Thieme Verlag, 1998). A "virtually spherical" geometry means that the dispersed primary particles of the microgels, when the composition is viewed, for example with an electron microscope, discernibly display essentially a circular surface. Since the microgels essentially do not change in shape in the organic medium (C), for example in the course of crosslinking, the remarks above and below also apply equally to the microgel-containing compositions obtained by crosslinking the inventive composition, if, for example, the organic medium is crosslinked.

In the primary particles of the microgel (A) present in the inventive composition, the deviation of the diameter of a single primary particle, defined as [(d1−d2)/d2]×100 in which d1 and d2 are any two diameters of the primary particle and d1>d2, is preferably less than 250%, more preferably less than 200%, even more preferably less than 100%, even more preferably less than 80%, even more preferably less than 50%.

Preferably at least 80%, more preferably at least 90%, even more preferably at least 95% of the primary particles of the microgel have a deviation in the diameter, defined as [(d1−d2)/d2]×100 in which d1 and d2 are any two diameters of the primary particle and d1>d2, of less than 250%, more preferably less than 200%, even more preferably less than 100%, even more preferably less than 80%, even more preferably less than 50%.

The aforementioned deviation in the diameter of the single particles is determined by the following method. First, a thin section of the inventive composition is produced. Then a transmission electron micrograph is produced at a magnification of, for example, 10 000 or 200 000. Within an area of 833.7 nm×828.8 nm, the largest and smallest diameter are determined manually on 10 microgel primary particles as d1 and d2. When the above-defined deviation for at least 80%, more preferably at least 90%, even more preferably at least 95%, of the microgel primary particles analyzed is in each case below 250%, more preferably below 100%, even more preferably below 80%, even more preferably below 50%, the microgel primary particles have the above-defined feature of the deviation.

When the concentration of the microgels in the composition is so high that there is significant overlap of the visible microgel primary particles, the evaluability can be improved by preceding suitable dilution of the analysis sample. In the inventive composition, the primary particles of the microgel (A) preferably have an average particle diameter of 5 to 500 nm, more preferably of 20 to 400 nm, more preferably of 20 to 300 nm, more preferably of 20 to 250 nm, even more preferably of 20 to 99 nm, even more preferably of 40 to 80 nm (diameter figures to DIN 53206). The production of particularly fine microgels by emulsion polymerization is effected by controlling the reaction parameters in a manner known per se (see, for example, H. G. Elias, Makromoleküle, Volume 2, Technologie, $5^{th}$ edition, 1992, page 99 ff).

Since the morphology of the microgels in the polymerization or crosslinking of the inventive composition essentially does not change, the average particle diameter of the dispersed primary particles corresponds essentially to the average particle diameter of the dispersed primary particles in the composition obtained by polymerization or crosslinking.

In the inventive composition, the microgels (A) appropriately have proportions insoluble in toluene at 23° C. (gel content) of at least about 70% by weight, more preferably at least about 80% by weight, even more preferably at least about 90% by weight. The proportion insoluble in toluene is determined in toluene at 23° C. This is done by swelling 250 mg of the microgel in 20 ml of toluene while shaking at 23° C. for 24 hours. After centrifuging at 20 000 rpm, the insoluble proportion is removed and dried. The gel content is calculated from the quotient of the dried residue and the starting weight, and is reported in percent by weight.

In the inventive composition, the microgels (A) appropriately have a swelling index in toluene at 23° C. of less than about 80, more preferably of less than 60, even more preferably of less than 40. For instance, the swelling indices of the microgels (Qi) may more preferably be between 1 and 15. The swelling index is calculated from the weight of the solvent-containing microgel which has swollen in toluene at 23° C. for 24 hours (after centrifugation at 20 000 rpm) and the weight of the dry microgel: Qi=wet weight of the microgel/dry weight of the microgel.

To determine the swelling index, 250 mg of the microgel are allowed to swell in 25 ml of toluene while shaking for 24 h. The gel is centrifuged off and weighed moist, and then dried to constant weight at 70° C. and weighed once again.

In the inventive composition, the microgels (A) appropriately have glass transition temperatures Tg of −100 to 120° C., more preferably of −100 to 100° C., even more preferably of −80 to 80° C. In rare cases, it is also possible to use microgels which do not have a glass transition temperature owing to their high degree of crosslinking.

Glass transition temperatures of the microgels below room temperature (20° C.) are advantageous particularly in order to leave the tear propagation resistance and the hardness very substantially unaffected in microgel-containing polymer compositions, whereas the rheology of the compositions to be polymerized is influenced in the desired manner.

Glass transition temperatures of the microgels (A) above room temperature (20° C.) are advantageous in order to achieve an increase in the hardness, a greater reinforcement, an improved tear propagation resistance in microgel-containing polymer compositions, and to influence the rheology of the compositions to be polymerized in the desired manner.

Moreover, the microgels used in the inventive composition appropriately have a range of the glass transition of greater than 5° C., preferably greater than 10° C., more preferably greater than 20° C.

Microgels which have such a broad range of the glass transition are generally—in contrast to fully homogeneously radiation-crosslinked microgels—incompletely homogeneously crosslinked. The effect of this is that the change in modulus from the matrix phase to the dispersed phase in the crosslinkable or polymerized compositions produced from the inventive compositions is not immediate. As a result, abrupt stress on these compositions does not cause tearing effects between matrix and dispersed phase, which has an advantageous effect on the mechanical properties, the swelling behavior and the stress-cracking corrosion, etc.

The glass transition temperatures (Tg) and the range of the glass transition (ΔTg) of the microgels are determined by differential thermal analysis (DTA, DSC) under the following conditions:

For the determination of Tg and ΔTg, two cooling/heating cycles are carried out. Tg and ΔTg are determined in the second heating cycle. For the determination, 10-12 mg of the selected microgel are used in a DSC sample vessel (standard aluminum pan) from Perkin-Elmer. The first DSC cycle is carried out by first cooling the sample with liquid nitrogen to −100° C. and then heating it to 150° C. at a rate of 20 K/min. The second DSC cycle is commenced by immediately cooling the sample as soon as a sample temperature of 150° C. has been attained. The cooling is effected at a rate of about 320 K/min. In the second heating cycle, the sample is heated up once again to 150° C. as in the first cycle. The heating rate in the second cycle is again 20 K/min. Tg and ΔTg are determined graphically on the DSC curve of the second heating operation. For this purpose, three straight lines are drawn against the DSC curve. The 1st straight line is drawn against the part of the DSC curve below Tg, the 2nd straight line against the part of the curve which runs through Tg and has a turning point, and the 3rd straight line against the part of the DSC curve above Tg. In this way, three straight lines with two points of intersection are obtained. Each point of intersection is characterized by a characteristic temperature. The glass transition temperature Tg is obtained as the mean of these two temperatures, and the range of the glass transition ΔTg is obtained from the difference of the two temperatures.

The microgels which have not been crosslinked by high-energy radiation and are present in the inventive composition, which are preferably based on homopolymers or random copolymers, can be produced in a manner known per se (see, for example, EP-A-0 405 216, EP-A-0 854 171, DE-A 42 20 563, GB-A 10 78 400, DE 197 01 489, DE 197 01 488, DE 198 34 804, DE 198 34 803, DE 198 34 802, DE 199 29 347, DE 199 39 865, DE 199 42 620, DE 199 42 614, DE 100 21 070, DE 100 38 488, DE 100 39 749, DE 100 52 287, DE 100 56 311 and DE 100 61 174). Patents (or patent applications) EP-A 0 405 216, DE-A 42 20 563 and GB-A 10 78 400 claim the use of CR, BR and NBR microgels in mixtures with double bond-containing rubbers; DE 197 01 489 describes the use of subsequently modified microgels in mixtures with double bond-containing rubbers such as NR, SBR and BR. The disclosures of the aforementioned patents (or patent applications) in this respect are incorporated into the present invention by reference.

In a preferred embodiment of the invention, the microgel (A) in the inventive composition is based on rubber. The term "microgel" in the context of the present invention is appropriately and preferably understood to mean rubber particles which are obtained especially by crosslinking the following rubbers:

BR: polybutadiene,
ABR: butadiene/C1-4-alkyl acrylate copolymers,
IR: polyisoprene,
SBR: styrene-butadiene copolymers having styrene contents of 1 to 90% by weight, preferably 5 to 50% by weight,
X-SBR: carboxylated styrene-butadiene copolymers,
FKM: fluoro rubber,
ACM: acrylate rubber,
NBR: polybutadiene-acrylonitrile copolymers having acrylonitrile contents of 5 to 60% by weight, preferably 10 to 50% by weight,
X-NBR: carboxylated nitrile rubbers,
CR: polychloroprene,
IIR: isobutylene/isoprene copolymers having isoprene contents of 0.5 to 10% by weight,
BIIR: brominated isobutylene/isoprene copolymers having bromine contents of 0.1 to 10% by weight,
CIIR: chlorinated isobutylene/isoprene copolymers having bromine contents of 0.1 to 10% by weight,
HNBR: partly and fully hydrogenated nitrile rubbers,
EPDM: ethylene-propylene-diene copolymers,
EAM: ethylene/acrylate copolymers,
EVM: ethylene/vinyl acetate copolymers,
CO and ECO: epichlorohydrin rubbers,
Q: silicone rubbers,
AU: polyesterurethane polymers,
EU: polyetherurethane polymers,
ENR: epoxidized natural rubber or mixtures thereof.

The uncrosslinked microgel starting materials are appropriately produced by the following methods:
1. emulsion polymerization or
2. solution polymerization of rubbers which are not obtainable via variant 1.

It is also possible to use naturally occurring latices, for example natural rubber latex. In the inventive composition, the microgels (A) used are preferably those obtainable by emulsion polymerization and crosslinking.

In the preparation of the microgels used in accordance with the invention by emulsion polymerization, for example, the following free-radically polymerizable monomers are used: butadiene, styrene, acrylonitrile, isoprene, esters of acrylic and methacrylic acid, tetrafluoroethylene, vinylidene fluoride, hexafluoropropene, 2-chlorobutadiene, 2,3-dichlorobutadiene and double bond-containing carboxylic acids, for example acrylic acid, methacrylic acid, maleic acid, itaconic acid, etc., double bond-containing hydroxyl compounds, for example hydroxyethyl methacrylate, hydroxyethyl acrylate, hydroxybutyl methacrylate, amine-functionalized (meth) acrylates, acrolein, N-vinyl-2-pyrrolidone, N-allylurea and N-allylthiourea, and also secondary amino(meth)acrylic esters such as 2-tert-butylaminoethyl methacrylate and 2-tert-butylaminoethylmethacrylamide, etc. The crosslinking of the rubber gel can be achieved directly during the emulsion polymerization, such as by copolymerization with crosslinking polyfunctional compounds or by subsequent crosslinking as described below. The use of directly crosslinked microgels constitutes a preferred embodiment of the invention.

Preferred polyfunctional comonomers are compounds having at least 2, preferably 2 to 4, copolymerizable C=C double bonds, such as diisopropenylbenzene, divinylbenzene, divinyl ether, divinyl sulfone, diallyl phthalate, triallyl cyanurate, triallyl isocyanurate, 1,2-poly-butadiene, N,N'-m-phenylenemaleimide, 2,4-tolylenebis(maleimide) and/or triallyl trimellitate.

Additionally useful are the acrylates and methacrylates of polyhydric, preferably di- to tetrahydric, C2- to C10-alcohols, such as ethylene glycol, propanediol-1,2, butanediol, hexanediol, polyethylene glycol having 2 to 20 and preferably 2 to 8 oxyethylene units, neopentyl glycol, bisphenol A, glycerol, trimethylolpropane, pentaerythritol, sorbitol, with unsaturated polyesters formed from aliphatic di- and polyols, and also maleic acid, fumaric acid and/or itaconic acid.

The crosslinking to give rubber microgels during the emulsion polymerization can also be effected by continuing the polymerization up to high conversions, or in the monomer feed process by polymerization with high internal conversions. Another possibility is also to perform the emulsion polymerization in the absence of regulators.

For the crosslinking of the uncrosslinked or of the lightly crosslinked microgel starting materials after the emulsion polymerization, it is best to use the latices which are obtained in the emulsion polymerization. In principle, this method can also be employed in the case of nonaqueous polymer dispersions which are obtainable in another way, for example by reprecipitation. It is also possible to crosslink natural rubber latices in this way.

Suitable crosslinking chemicals are, for example, organic peroxides, such as dicumyl peroxide, tert-butyl cumyl peroxide, bis(tert-butylperoxyisopropyl)benzene, di-tert-butyl peroxide, 2,5-dimethylhexane 2,5-dihydroperoxide, 2,5-dimethylhex-3-ine 2,5-dihydro-peroxide, dibenzoyl peroxide, bis(2,4-dichlorobenzoyl)peroxide, tert-butyl perbenzoate, and organic azo compounds such as azobisisobutyronitrile and azobiscyclohexanenitrile, and also di- and polymercapto compounds, such as dimercaptoethane, 1,6-dimercaptohexane, 1,3,5-trimercaptotriazine, and mercapto-terminated polysulfide rubbers such as mercapto-terminated reaction products of bischloroethyl formal with sodium polysulfide.

The optimal temperature for performance of the postcrosslinking depends by its nature on the reactivity of the crosslinking agent, and it can be performed at temperatures from room temperature up to approx. 180° C., optionally under elevated pressure (see Houben-Weyl, Methoden der organischen Chemie [Methods of organic chemistry], $4^{th}$ edition, Volume 14/2, page 848). Particularly preferred crosslinking agents are peroxides.

The crosslinking of rubbers containing C=C double bonds to microgels can also be effected in dispersion or emulsion with simultaneous partial or complete hydrogenation of the C=C double bond by hydrazine, as described in U.S. Pat. Nos. 5,302,696 or 5,442,009, or optionally other hydrogenating agents, for example organometallic hydride complexes.

Before, during or after the postcrosslinking, it is optionally possible to perform particle enlargement by agglomeration.

In the preparation process used in accordance with the invention, incompletely homogeneously crosslinked microgels are always obtained, which may have the above-described advantages.

It is also possible for rubbers which are prepared by solution polymerization to serve as starting materials for the production of the microgels. In these cases, the starting materials are solutions of these rubbers in suitable organic solvents.

The desired sizes of the microgels are established by mixing the rubber solution in a liquid medium, preferably in water, optionally with addition of suitable surface-active assistants, for example surfactants, by means of suitable units such that a dispersion of the rubber within the suitable particle size range is obtained. For the crosslinking of the dispersed solution rubbers, the procedure is as described above for the subsequent crosslinking of emulsion polymers. Suitable crosslinking agents are the aforementioned compounds, and the solvent used for the preparation of the dispersion can optionally be removed before the crosslinking, for example by distillation.

The microgels used to produce the inventive composition may be either unmodified microgels which have essentially no reactive groups, especially at the surface, or modified microgels which have been modified with functional groups, especially at the surface. The latter can be prepared by chemical reaction of the already crosslinked microgels with chemicals reactive toward C=C double bonds. These reactive chemicals are especially those compounds with whose aid it is possible to chemically bond polar groups, for example aldehyde, hydroxyl, carboxyl, nitrile, etc., and sulfur-containing groups, for example mercapto, dithiocarbamate, polysulfide, xanthogenate, thiobenzothiazole and/or dithiophosphoric acid groups and/or unsaturated dicarboxylic acid groups to the microgels. This is also true of N,N'-m-phenylenediamine. The aim of the microgel modification is the improvement of the microgel compatibility when the inventive composition is used to produce the later matrix into which the microgel has been incorporated, or the inventive composition is used for incorporation into a matrix, in order to achieve good distributability in the production and good coupling.

Particularly preferred methods of modification are grafting of the microgels with functional monomers, and reaction with low molecular weight agents.

For the grafting of the microgels with functional monomers, the starting material is appropriately the aqueous microgel dispersion, which is reacted with polar monomers such as acrylic acid, methacrylic acid, itaconic acid, hydroxyethyl (meth)acrylate, hydroxypropyl (meth)acrylate, hydroxybutyl (meth)acrylate, acrylamide, methacrylamide, acrylonitrile, acrolein, N-vinyl-2-pyrrolidone, N-allylurea and N-allylthiourea, and also secondary amino(meth)acrylic esters such as 2-tert-butylaminoethyl methacrylate and 2-tert-butylaminoethylmethacrylamide, under the conditions of a free-radical emulsion polymerization. In this way, microgels are obtained with a core/shell morphology, in which case the shell should have a high compatibility with the matrix. It is desirable that the monomer used in the modification step is grafted very substantially quantitatively onto the unmodified microgel. Appropriately, the functional monomers are metered in before the microgels have been crosslinked fully.

Also conceivable in principle is grafting of the microgels in nonaqueous systems, in which case modification with monomers by ionic polymerization methods is also possible.

The following reagents in particular are useful for a surface modification of the microgels with low molecular weight agents: elemental sulfur, hydrogen sulfide and/or alkyl polymercaptans, such as 1,2-dimercaptoethane or 1,6-dimercaptohexane, and also dialkyl and dialkylaryl dithiocarbamate, such as the alkali metal salts of dimethyl dithiocarbamate and/or dibenzyl dithiocarbamate, and also alkyl and aryl xanthogenates, such as potassium ethylxanthogenate and sodium isopropylxanthogenate, and the reaction with the alkali metal or alkaline earth metal salts of dibutyldithiophosphoric acid and dioctyldithiophosphoric acid, and also dodecyldithiophosphoric acid. The reactions mentioned may advantageously also be performed in the presence of sulfur, in which case the sulfur is also incorporated to form polysulfidic bonds. For addition of this compound, it is possible to add free-radical initiators, such as organic and inorganic peroxides and/or azo initiators.

Another option is a modification of double bond-containing microgels, for example by ozonolysis and by halogenation with chlorine, bromine and iodine.

A further reaction of modified microgels, for example the production of hydroxyl group-modified microgels from epoxidized microgels, is also understood as a chemical modification of microgels.

In a preferred embodiment, the microgels are modified by hydroxyl groups, especially also at the surface thereof. The hydroxyl group content of the microgels is determined by reaction with acetic anhydride and titration of the acetic acid released with KOH to DIN 53240 as the hydroxyl number with the dimension of mg KOH/g of polymer. The hydroxyl number of the microgels is preferably between 0.1 and 100 and more preferably between 0.5 and 50 mg KOH/g of polymer.

The amount of the modifying agent used is guided by the efficacy thereof and the requirements made in the individual case, and is in the range from 0.05 to 30% by weight, based on the total amount of rubber microgel used, particular preference being given to 0.5-10% by weight, based on the total amount of rubber gel.

The modifying reactions can be performed at temperatures of 0 to 180° C., preferably 20 to 95° C., optionally under a pressure of 1 to 30 bar. The modifications can be undertaken on rubber microgels in substance or in the form of a dispersion thereof, in which latter case inert organic solvents or else water can be used as the reaction medium. The modification is more preferably performed in aqueous dispersion of the crosslinked rubber.

The use of unmodified microgels is preferred especially in the case of inventive compositions which comprise crosslinkable media which lead to the formation of nonpolar thermoplastic materials, for example polypropylene, polyethylene, and block copolymers based on styrene, butadiene and isoprene (SBR, SIR), and also hydrogenated isoprene-styrene block copolymers (SEBS) and customary thermoplastic polyolefin elastomers (TPE-O) and thermoplastic elastomer vulcanizates (TPE-V), etc.

The use of modified microgels is preferred especially in the case of inventive compositions which comprise crosslinkable media which lead to the formation of polar thermoplastic materials, for example polyamide (PA), thermoplastic polyamides (TPE-A), polyurethanes (PU), thermoplastic polyurethane elastomers (TPE-U), polycarbonates (PC), polyethylene terephthalate (PET), polybutylene terephthalate (PBT), polyoxymethylene (POM), polymethyl methacrylate (PMMA), polyvinyl chloride (PVC), acrylonitrile-butadiene-styrene copolymers (ABS), polytetrafluoroethylene (PTFE), polyvinylidene fluoride (PVDF), etc.

The mean diameter of the microgels produced can be adjusted with high accuracy, for example, to 0.1 micrometer (100 nm)±0.01 micrometer (10 nm), such that, for example, a particle size distribution is achieved in which at least 75% of all microgel particles are between 0.095 micrometer and 0.105 micrometer in size. Other mean diameters of the microgels, especially in the range between 5 and 500 nm, can be produced with the same accuracy (at least 75% of all particles are around the maximum of the integrated particle size distribution curve (determined by light scattering) within a range of ±10% above and below the maximum), and used. This allows the morphology of the microgels dispersed in the inventive composition to be adjusted virtually exactly as required, and hence the properties of the inventive composition and of the plastics, for example, produced therefrom to be established.

The microgels thus produced, preferably based on BR, SBR, NBR, SNBR or acrylonitrile or ABR, can be worked up, for example, by evaporative concentration, coagulation, by co-coagulation with a further latex polymer, by freeze coagulation (cf. U.S. Pat. No. 2,187,146) or by spray drying. In the case of workup by spray drying, it is also possible to use customary flow aids, for example $CaCO_3$ or silica.

Carbon Nanotubes (B)

The inventive composition comprises at least one compound comprising carbon nanotubes. Carbon nanotubes are understood in the context of the present invention to mean microscopically small tubular structures (molecular nanotubes) formed from carbon. The walls thereof, like those of the fullerenes or like the planes of graphite, consist essentially only of carbon, the carbon atoms assuming a honeycomb-like structure with hexagons and three bonding partners each (defined by the $sp^2$ hybridization).

Carbon nanotubes are frequently abbreviated to CNTs.

Carbon nanotubes thus derive from the carbon planes of graphite, which are rolled up to give a tube: the carbon atoms form a honeycomb-like structure with hexagons and three bonding partners each. Tubes with ideally hexagonal structure have a homogeneous thickness and are linear; however, kinked or narrowing tubes which contain pentagonal carbon rings are also possible. According to how the honeycomb of the graphite is rolled up to give the tube ("straight" or "obliquely"), the result is helical structures (wound in the manner of a screw) and also those which are not mirror-symmetric, i.e. not chiral. In the literature, the index pair (n,m) is used for distinction between 3 classes. These are known as armchair (with (n,n), achiral, non-helical), zig-zag ((n,0), achiral, helical) and chiral ((n,m), chiral, helical). The first two names relate to the form of the line which results when the C—C bonds are followed along the periphery. All three classes are suitable for the inventive composition.

The diameter of the tubes provided in accordance with the invention is preferably in the range from 0.1 to 250 nm, more preferably 3 to 100 nm, especially 5 to 50 nm. The length of the carbon nanotubes for use in accordance with the invention is preferably 10 nm to 1 mm, more preferably 50 nm to 100 µm, especially 100 nm to 20 µm.

The aspect ratio is preferably more than 100, more preferably more than 500, especially more than 3000 (L:D, i.e. length:diameter).

In the inventive composition, it is possible to use single-wall and multiwall carbon nanotubes. It is also possible to use open or closed tubes, i.e. carbon nanotubes which have been provided with one or two lids which have a section from a fullerene structure.

The carbon nanotubes are in agglomerated form as particles with particle diameters of 0.1-2 mm. In the dispersion of the carbon nanotubes in the organic media, the particles have to be divided and the nanotubes isolated in the matrix.

In the context of the present invention, it is possible through selection of appropriate structures of the carbon tubes to render the electrical conductivity within the tubes either metallic or semiconductive; it is also possible to use carbon tubes which are superconductive at low temperatures.

In the inventive compositions, preference is given to using carbon nanotubes which have a density of 1.0 to 2.0 g/cm$^3$, more preferably 1.1 to 1.8 g/cm$^3$, especially 1.5 to 1.75 g/cm$^3$.

The inventive composition preferably has a viscosity of 25 mPas up to 5 000 000 mPas, more preferably 200 mPas up to 3 000 000 mPas, at a speed of 5 s$^{-1}$ in a cone plate viscometer to DIN 53018 at 20° C.

Carbon nanotubes suitable in accordance with the invention can be obtained by a multitude of different processes. These processes include, for example, process steps which are carried out in apparatus selected from the group consisting of fixed bed reactors, tubular reactors, rotary tube reactors, bubble-forming, turbulent or jet-assisted fluidized bed reactors, internally and externally circulated fluidized bed reactors.

A suitable synthesis of carbon nanotubes is effected by light arc discharge of graphite in the presence of metal catalysts (e.g. Fe, Co, Ni). Further suitable processes are the laser-controlled evaporation of mixtures comprising graphite, nickel and/or cobalt, chemical vapor deposition processes (CVD processes), for which different carbon sources can be used, or gas phase syntheses. Further suitable processes are described, for example, in DE 10 2004 054 959 A1, DE 102 57 025, EP 1 059 266, EP 0 205 556 A and WO 86/03455 A, and in the prior art cited therein, the disclosure of which on this subject is incorporated into the present invention.

The carbon tubes used in the present invention are obtained especially by a process which is described in DE 10 2004 054 859 A1.

The carbon tubes obtainable by the above-described processes still have, immediately after production thereof, relatively large amounts of impurities or sidewall defects, which can be eliminated by suitable aftertreatments. Production-related impurities include primarily amorphous carbon, metal particles enclosed by graphite, graphite-like materials and fullerenes.

In the context of the present invention, it is, however, also possible to use unpurified carbon nanotubes. Accordingly, in a preferred embodiment of the present invention, at least one carbon nanotube which has not been subjected to any purification or workup after production thereof is used.

If the carbon nanotubes are to be subjected to a purification, this can be effected by suitable processes which are known per se to those skilled in the art and include liquid and/or gas phase oxidations, which may optionally be followed by solvent extractions, ultrasound treatments, centrifugations, chromatographies and/or microwave treatments. In the course of the liquid phase oxidations, primarily strong acids, such as nitric acid, sulfuric acid and/or hydrochloric acid, are used in conjunction with correspondingly suitable oxidizing agents, such as hydrogen peroxide $H_2O_2$ or potassium permanganate $KMnO_4$.

Frequently, gas phase oxidation is also combined with liquid phase oxidation in order to remove metal-containing impurities. An overview of suitable processes for purifying carbon nanotubes is described in EP 1 428 793 A1, the disclosure of which on this subject is incorporated by reference into the present invention.

In the inventive composition, it is possible to use unmodified (non-modified) carbon nanotubes, or those modified by functional groups.

In one embodiment of the present invention, the carbon nanotubes used in the inventive composition have therefore been functionalized, in which case the carbon nanotubes may have been functionalized either covalently or noncovalently.

The functionalization is effected preferably via functional groups which are selected from the group consisting of hydroxyl, carboxyl and amine groups.

Examples of suitable processes for covalent functionalization are the above-described oxidative workup and/or purification processes, which generally lead to the introduction of carboxyl groups into the carbon nanotubes. By means of this carboxyl group, it is then optionally possible to undertake further functionalizations, for example amide formation by reaction of the carboxylic acid with an appropriate amine. This process also makes it possible to attach polymers to the carbon skeleton of the nanotubes.

It is also possible to attach metal complexes to single-wall carbon nanotubes by coordinate bonds via the metal atom and the oxygenated carbon bonds.

Examples of further covalent functionalizations for carbon nanotubes which can be used in the inventive composition are sidewall alkylations of fluorinated carbon nanotubes (Boul et al. (1999), Chem. Phys. Lett. 310, 367), reactions with aryldiazonium compounds (Bahr et al. (2001), J. Am. Chem. Soc. 123, 6536; Bahr et al. (2001), Chem. Mater. 13, 3823; Kooi et al. (2002), Angew. Chem. Int. Ed. 41, 1353), ultrasound-induced reactions with monochlorobenzene and poly(methyl methacrylates) (Koshio et al. (2001), Nano Lett. 1, 361), addition reactions of nitrenes and nucleophilic carbenes (Holzinger et al. (2001), Angew. Chem. Int. Ed., 40, 4002) and addition reactions of azomethinylidene (Georgakilas et al. (2002), J. Am. Chem. Soc. 124, 760).

Noncovalent functionalizations are generally effected by the adsorption of molecules onto the sidewalls of the carbon nanotubes. For this purpose, surfactants are frequently used, for example sodium dodecylsulfate (Duesberg et al. (1998), Appl. Phys. A 67, 117; Doom et al. (2002), J. Am. Chem. Soc., 124, 3169) or Triton surfactants (surfactants from the class of the octylphenol ethoxylates). In the case of use of Triton surfactants, the alcohol unit of the surfactant may serve for further covalent functionalizations (Shim et al. (2002), Nano Lett. 2, 285).

It is also possible to bond polymers to the carbon nanotubes in a noncovalent manner (Curran et al. (1998), Adv. Mater. 10, 1091; Tang et al. (1999), Macromolecules 32, 2569; Coleman et al. (2000), Adv. Mater. 12, 213; O'Connell et al. (2001), Chem. Phys. Lett. 342, 265; Bandyopadhyaya et al. (2002), Nano Lett. 2, 25; Star et al. (2002), Angew. Chem. Int. Ed. 41, 2508; Chen et al. (2002), J. Am. Chem. Soc. 124, 9034; Star et al. (2002), Macromolecules 35, 7516).

Salt formation between organic amines and the carboxylic acid groups formed by oxidation is also possible (Hamon et al. (1999), Adv. Mater. 11, 834; Chen et al. (2001), J. Phys. Chem. 105, 2525; Chattopadhyay et al. (2002), J. Am. Chem. Soc. 124, 728).

A further possibility is adsorption of pyrene derivatives onto the sidewalls of the carbon nanotubes.

In the context of the present invention, the carbon nanotubes used in the inventive composition may be reactive or unreactive toward the organic medium (C) and/or the crosslinking agent (D). This can be controlled, for example, by the type of components involved, for example by the type of functionalization of the carbon nanotubes.

Organic Medium (C)

The inventive composition comprises at least one organic medium (C). In the context of the invention, "organic medium" means that the chemical structure of the medium contains at least one carbon atom.

The medium (C) used in the inventive composition is either crosslinkable (C1) or noncrosslinkable (C2). It is also possible to use mixtures of crosslinkable (C1) or noncrosslinkable (C2) media.

In a first embodiment of the present invention, the organic medium (C) is crosslinkable.

The inventive composition then comprises at least one organic medium (C1) which, at a temperature of 120° C., has a viscosity of less than 30 000 mPas, preferably less than 10 000 mPas, more preferably less than 1000 mPas, even more preferably less than 750 mPas and even more preferably less than 500 mPas.

The viscosity of the crosslinkable organic medium is determined at a speed of $5\ s^{-1}$ with a cone-plate measuring system to DIN 53018 at 120° C.

Such a medium at room temperature (20° C.) is liquid to solid, preferably liquid or free-flowing.

The crosslinkable organic media (C1) are preferably those which are crosslinkable via functional groups containing heteroatoms or C=C groups.

These media generally have the abovementioned viscosities, but it is also possible in accordance with the invention to use crosslinkable media with higher viscosities and to mix them with further crosslinkable media of lower viscosity in order to establish the aforementioned viscosities.

The components (C1) used are preferably crosslinkable media which are liquid at room temperature (20° C.) and are generally hardened by reaction with a further component (D), for example by free-radical, especially peroxidic, crosslinking in the presence of free-radical initiators or by UV radiation, by polyaddition or polycondensation, as detailed below, to give plastics.

The selection of a component (D) suitable for crosslinking for a suitable crosslinkable organic medium (C1) is familiar per se to the person skilled in the art, and reference may be made to the relevant specialist literature.

The liquid, crosslinkable, organic media (C1) suitable for the production of the inventive compositions are, for example, polyols based on polyester, polyether or polyetherpolyester, and epoxy resins, unsaturated polyester resins and acrylate resins. In the resins or resin mixtures and their hardeners or hardener mixtures described here, one component preferably has a functionality close to 2.0 and the other component a functionality of preferably 1.5 to 2.5, more preferably of 2 to 2.5, such that polymers form which are linear or lightly branched, but not chemically crosslinked (on this subject, cf. G. W. Becker, D. Braun, Kunststoff-Handbuch [Plastics handbook], Volume 10, "Duroplaste" ["Thermosets"] Carl Hanser Verlag, Munich, Vienna, 1988, pages 1 ff.). It is also possible to use additions of mono- and polyfunctional components with a functionality of 1 to approx. 4, preferably 1 to 3, the overall result being functionalities of about 1.5 to 2.5.

Corresponding crosslinkable organic media are described by Walter Krauss in Kittel, Lehrbuch der Lacke and Beschichtungen [Textbook of lacquers and coatings], S. Hirzel Verlag Stuttgart, Leipzig, Volume 2, 1998, the disclosure of which on this subject is incorporated by reference into the present invention.

Polyesterpolyols are prepared by condensation of dicarboxylic acids with excess amounts of di- or polyols, or are based on caprolactones.

The polyetherpolyols used are preferably those based on propylene oxide and/or ethylene oxide. Polyoxytetramethylene glycols are also used.

The addition of alkylene oxides onto di- or polyamines leads to nitrogen-containing basic polyethers. The polyols mentioned are preferably reacted with aromatic isocyanates, such as TDI (tolylene diisocyanate) or MDI (methylenediphenyl diisocyanate), and in particular cases also with NDI (naphthalene 1,5-diisocyanate) or TODI (3,3'-dimethyl-4,4'-diisocyanatobiphenyl) and derivatives thereof, aromatic polyisocyanates on the same basis or aliphatic isocyanates (HDI, IPDI, $H_{12}$MDI (4,4'-dicyclohexylmethane diisocyanate), HDTI (methylcyclohexyl diisocyanate), XDI (xylylene diisocyanate), TMDI (trimethylhexamethylene diisocyanate), DMI (dimeryl diisocyanate)) or aliphatic polyisocyanates on the same basis, such as the trimer of HDI (hexamethylene diisocyanate) or of IPDI (isophorone diisocyanate).

Epoxy resins are hardened with aminic hardeners, amine adducts, amines or polyamines, or acid anhydrides.

Epoxy resins are prepared by reaction of phenols or alcohols with epichlorohydrin. The resin which is also the most important in terms of amount is bisphenol A diglycidyl ether, alongside bisphenol F diglycidyl ether. Further epoxy resins are the diluents such as hexanediglycidyl ether, the epoxide novolacs, the glycidyl esters, the glycidylamines, the glycidyl isocyanurates and the cycloaliphatic epoxides.

Important amines are the aliphatic and cycloaliphatic amines such as diethylenetriamine (DETA), triethylenetetramine (TETA), 3,3',5-trimethylhexamethylenediamine (TMD), isophoronediamine (IPD), m-xylylenediamine (MXDA), the aromatic amines such as methylenedianiline (MDA), 4,4'-diaminodiphenyl sulfone (DDS), amine adducts, for example formed from TMD and bisphenol A diglycidyl ether and DETA-phenol Mannich base, polyaminoamides as formed in amide formation from polyethyleneamines and monomer and dimer fatty acids, and dicyandiamide Amines with suitable low functionality are the corresponding alkylated types.

Cyclic acid anhydrides are, for example, phthalic anhydride (PA) and hexahydrophthalic anhydride.

Unsaturated polyester resins are linear, soluble polycondensation products formed from principally maleic or fumaric acid and dihydric alcohols, which may be dissolved in a monomer capable of copolymerization, usually styrene, and are polymerized by addition of peroxides.

The acids used in the UP resins may be adipic acid, phthalic acid, phthalic anhydride, tetrahydrophthalic acid, isophthalic acid, terephthalic acid, tetrachlorophthalic acid, tetrabromophthalic acid, Het acid and endomethylenetetrahydrophthalic anhydride. The diols used for UP resins are principally 1,2- and 1,3-propanediol, ethylene glycol, diethylene glycol, dipropylene glycol, and monoallyl ethers of glycerol and trimethylolpropane.

Monomers used, in addition to other polymerizable monomers, are, for example, styrene, alpha-methylstyrene, methyl acrylate, methyl methacrylate and vinyl acetate.

The crosslinking of the inventive crosslinkable composition is preferably performed with peroxide or by UV light or electron beams.

Similarly to the unsaturated polyester resins, the vinyl esters are as prepared, for example, by Dow-Derakane and Derakane Momentum.

The liquid crosslinkable organic media suitable for the production of the inventive compositions also include, for example: polyfunctional alcohols, such as difunctional alcohols, such as ethylene glycol, propanediol, butanediol, hexanediol, octanediol, polyetherpolyols, such as diethylene glycol, dipropylene glycol, polyalkylene oxide diols, such as polyethylene oxide diols and/or polypropylene oxide diols, polyhexamethylene carbonate diols, polyfunctional alcohols, such as glycerol, trimethylolpropane, etc., polyfunctional carboxylic acids, cyclic carboxylic anhydrides, polyfunctional isocyanates, such as TDI (tolylene diisocyanate), MDI (methylenediphenyl diisocyanate), NDI (naphthalene 1,5-diisocyanate), TODI (3,3'-dimethyl-4,4'-diisocyanato biphenyl) and derivatives thereof, HDI, IPDI, $H_{12}$MDI (4,4'-dicyclohexylmethane diisocyanate), HTDI (methylcyclohexyl diisocyanate), XDI (xylylene diisocyanate), TMDI (trimethylhexamethylene diisocyanate), DMI (dimeryl diisocyanate) or aliphatic polyisocyanates on the same basis, such as the trimer of HDI (hexamethylene diisocyanate) or of IPDI (isophorone diisocyanate), polyisocyanate prepolymers, especially oligomerized diisocyanates, capped polyisocyanates, polyfunctional amines, such as those mentioned above, such as ethylenediamine, tetramethylenediamine, hexamethylenediamine, trimethylhexamethylenediamine, isophoronediamine, dodecyldiamine, lactams, such as caprolactam, butyrolactam, lactones, such as gamma-butyrolactone, caprolactone, cyclic ethers, such as tetrahydrofuran, unsaturated hydrocarbons, ethylene, propylene, butadiene, styrene, methylstyrene, acrylonitrile, vinyl esters, such as vinyl acetate, vinyl propionate, vinyl butyrate, cyclopentene, norbornene, dicyclopentene, etc.

Further possible crosslinkable media are methyl methacrylate, alkyl methacrylates, alkyl acrylates, or mixtures with comonomers such as methacrylates or acrylates which are hardened by peroxides or UV radiation/electron beams.

Particularly preferred crosslinkable organic media are polyols, polyetherpolyols, polyether diols, polyester diols, polyetherester diols, polyhexamethylene carbonate diols, diisocyanates, polyisocyanate prepolymers. Polyols are especially suitable. In a particularly preferred embodiment, the organic medium is therefore a polyol, especially a diol, or a mixture of a polyol and a diol.

In a further preferred embodiment, the crosslinkable organic medium (C1) is at least one polyol, preferably a diol, or a mixture of a polyol and a diol, and the crosslinking agent is a polyisocyanate, preferably a diisocyanate, or a mixture of a polyisocyanate and a diisocyanate.

It is also possible to mix the polyfunctional compounds typically referred to as the crosslinker (D) of a polymer system, as the crosslinkable medium in the context of the invention, with the microgels and the carbon nanotubes, and to react the resulting composition with the corresponding component to be crosslinked.

In principle, it has to be ensured that the microgels and/or the carbon nanotubes, especially when they have been functionalized, can be reactive toward the crosslinkable medium (system (C, D)).

It is also possible for polymers or copolymers of the monomers mentioned to be dissolved in the above-described materials.

For the hardening with UV radiation/electron beams, the monomers used are especially, for example, 2-ethylhexyl acrylate (EHA), stearyl acrylate, and polyether acrylates, for example polyethylene glycol diacrylate 400 (PEG400DA), polyester acrylates which are prepared, for example, from polyesterpolyols or corresponding polyol/polycarboxylic acid mixtures by esterification with acrylic acid, urethane acrylates and acrylated polyacrylates.

When an organic crosslinkable medium (C1) and a crosslinking agent (D) are used in the inventive composition, the present invention also encompasses an arrangement comprising, in spatially separate form, the inventive composition and a composition which comprises the crosslinking agent (D) for the crosslinkable organic medium or a composition which consists of the crosslinking agent.

In a further embodiment, the inventive composition comprises a noncrosslinkable organic medium (C2).

In this case, the organic noncrosslinkable medium (C2) has, at a temperature of 120° C., a viscosity of preferably less than 100 000 mPas, more preferably less than 1000 mPas, further preferably less than 200 mPas, even more preferably less than 100 mPas.

Such a medium is liquid to solid at room temperature (20° C.).

Noncrosslinkable media in the context of the present invention are especially understood to mean those media which do not contain any groups crosslinkable via heteroatom-containing functional groups or C=C groups, such as especially customary monomers or prepolymers which are typically crosslinked or polymerized free-radically, with UV beams, thermally and/or with addition of crosslinking agents (e.g. polyisocyanates), etc. to form oligomers or polymers in the customary manner. Noncrosslinkable media are especially also solvents, especially those according to DIN 55 945.

The noncrosslinkable medium (C2) preferably comprises noncrosslinkable media liquid at room temperature (20° C.), especially hydrocarbons (straight-chain, branched, cyclic, saturated, unsaturated and/or aromatic hydrocarbons having 1 to 200 carbon atoms, which may optionally be substituted by one or more substituents selected from halogens, such as chlorine, fluorine, hydroxyl, oxo, amino, carboxyl, carbonyl, aceto and amido, synthetic hydrocarbons, polyetherols, esterols, phosphoric esters, silicon-containing oils and halohydrocarbons or halocarbons (see, for example, Ullmanns Enzyklopädie der technischen Chemie, Verlag Chemie Weinheim, Volume 20, (1981) 457 ff., 504, 507ff., 517/518, 524). These noncrosslinkable media (C2) are notable especially for viscosities of 2 to 1500 $mm^2$/s (cSt) at 40° C.

The noncrosslinkable medium (C2) preferably comprises noncrosslinkable media liquid at room temperature (20° C.), especially solvents according to DIN 55 945, such as xylene, solvent naphtha, methyl ethyl ketone, methoxypropyl acetate, N-methylpyrrolidone and dimethyl sulfoxide.

The synthetic hydrocarbons are obtained by polymerization of olefins, condensation of olefins or chloroparaffins with aromatics, or dechlorinating condensation of chloroparaffins. Examples of the polymer oils are the ethylene polymers, the propylene polymers, the polybutenes, the polymers of higher olefins, the alkyl aromatics. The ethylene polymers have molecular weights between 400 and 2000 g/mol. The polybutenes possess molecular weights between 300 and 1500 g/mol.

In the case of the polyether ols, a distinction is drawn between aliphatic polyether ols, polyalkylene glycols, especially polyethylene glycols and polypropylene glycols, the copolymers thereof, the mono- and diethers and ester ethers and diesters thereof, tetrahydrofuran polymer oils, perfluoropolyalkyl ethers and polyphenyl ethers. Perfluoropolyalkyl ethers have molar masses of 1000 to 10 000 g/mol. The aliphatic polyetherols have viscosities of 8 to 19 500 mm$^2$/s at 38° C.

Polyphenyl ethers are prepared by condensation of alkali metal phenoxides with halobenzenes. The diphenyl ethers and alkyl derivatives thereof also find use.

Examples of the ester oils are the alkyl esters of adipic acid, bis(2-ethylhexyl)sebacate and bis(3,5,5-trimethylhexyl)sebacate or adipate. A further class is that of the fluorinated ester oils. In the case of phosphoric esters, a distinction is drawn between triaryl, trialkyl and alkyl aryl phosphates. Examples are tri(2-ethylhexyl)phosphate and bis(2-ethylhexyl)phenyl phosphate.

Silicon-containing oils are the silicone oils (polymers of the alkyl- and arylsiloxane series) and the silicic esters.

The halohydrocarbons or halocarbons include chlorinated paraffins, such as chlorotrifluoroethylene polymer oils and hexafluorobenzene.

(Nonreactive) solvents according to DIN 55 945 are hexane, special-boiling-point spirit, white spirit, xylene, solvent naphtha, balsam terpentine oil, methyl ethyl ketone, methyl isobutyl ketone, methyl amyl ketone, isophorone, butyl acetate, 1-methoxypropyl acetate, butyl glycol acetate, ethyl diglycol acetate and N-methylpyrrolidone (Brock, Thomas, Groteklaes, Michael, Mischke, Peter, Lehrbuch der Lacktechnologie [Textbook of coatings technology], Curt R. Vincentz Verlag Hanover, (1998) 93ff).

Particularly preferred noncrosslinkable media (C2) are the large class of the hydrocarbons, the polyether oils, and the solvents according to DIN 55 945.

Composition

The inventive composition comprises preferably 0.5 to 90% by weight, more preferably 1 to 60% by weight, more preferably 1 to 40% by weight, even more preferably 2 to 30% by weight, even more preferably 5 to 25% by weight, of the microgel (A), based on the total amount of the composition.

The inventive composition comprises preferably 0.1 to 90% by weight, more preferably 0.1 to 80% by weight, especially preferably 0.1 to 50% by weight, in particular 0.5 to 40% by weight, especially 1 to 20% by weight, even more especially 1 to 10% by weight, of the carbon nanotubes (B), based on the total amount of the composition.

The inventive composition further preferably comprises 10 to 99.9% by weight, more preferably 40 to 97% by weight, more preferably 30 to 95% by weight, even more preferably 50 to 95% by weight, even further preferably 60 to 95% by weight, of the organic medium (C).

It is further preferred when the weight ratio of the at least one microgel (A) to the at least one carbon nanotube (B) is 0.1:100 to 100:0.1, more preferably 1:90 to 90:1, in particular 10:90 to 90:10, especially 10:50 to 50:10.

In a further embodiment of the present invention, the weight ratio of at least one microgel (A) to at least one carbon nanotube (B) is 0.1:99 to 99:0.1.

The inventive composition consists preferably of the microgel, the carbon nanotube and the organic medium, and optionally the crosslinking agent (D). The presence of water is not preferred. The inventive compositions preferably comprise less than 0.8% by weight, even more preferably less than 0.5% by weight, of water. Most preferably, the presence of water is ruled out (<0.1% by weight).

In a preferred embodiment of the present invention, the inventive composition may also comprise a mixture of a crosslinkable and a noncrosslinkable organic medium. It is further preferred when the weight ratio of the crosslinkable (C1) to the noncrosslinkable medium content (C2) is 0.1:99 to 99:0.1, more preferably 10:90 to 90:10, especially 10:50 to 50:10. With regard to the individual solvent types, reference is made to the above remarks regarding the individual media (C1) and (C2). In this case too, a crosslinking agent (D) is used for the crosslinkable organic solvent (C1).

Optionally, the inventive composition may additionally comprise customary fillers and additives, especially pigments.

Particularly preferred pigments and fillers for production of the inventive compositions which comprise the organic medium, and microgel-containing plastics produced therefrom, are, for example: inorganic and organic pigments, silicatic fillers such as kaolin, talc, carbonates such as calcium carbonate and dolomite, barium sulfate, metal oxides such as zinc oxide, calcium oxide, magnesium oxide, aluminum oxide, finely divided silicas (precipitated and thermally produced silicas), metal hydroxides such as aluminum hydroxide and magnesium hydroxide, glass fibers and glass fiber products (bars, strands or glass microbeads), carbon fibers, thermoplastic fibers (polyamide, polyester, aramid), rubber gels based on polychloroprene and/or polybutadiene, or else all other above-described gel particles which possess a high degree of crosslinking and particle size 5 to 1000 nm. The fillers mentioned may be used alone or in a mixture.

The inventive compositions may comprise further assistants such as crosslinkers, reaction accelerators, aging stabilizers, heat stabilizers, light stabilizers, ozone stabilizers, plasticizers, tackifiers, blowing agents, dyes, waxes, extenders, organic acids, retardants, and also filler activators, for example trimethoxysilane, polyethylene glycol, solvents such as those mentioned above, or others known in the industries described.

The assistants are used in customary amounts which are guided by the end use among other factors. Customary amounts are, for example, amounts of 0.1 to 80% by weight, preferably 0.1 to 50% by weight, based on the amount of liquid crosslinkable medium used.

Process for Producing Inventive Compositions

In a particularly preferred embodiment of the process, 1 to 30 parts by weight of rubber gel are used, optionally together with 0.1 to 40 parts by weight of fillers and 30 to 99 parts by weight of the organic medium (C), to produce the inventive compositions.

The inventive composition preferably has a viscosity of 25 mPas to 20 000 000 mPas, more preferably 25 to 2 000 000 mPas, especially 50 to 1 000 000 mPas, determined in each case at a speed of 5 s$^{-1}$ on a cone-plate test system to DIN 53018 at 20° C.

In a preferred embodiment, the inventive composition is produced by mixing at least one above-defined organic medium, at least one above-defined carbon nanotude and at least one above-defined microgel. In a preferred embodiment, at least one dry microgel powder (A) (preferably less than 1% by weight, more preferably less than 0.5% by weight, of volatile fractions (when mixing components (C) and (B), no microgel latices are used)) is used. The mixing is effected preferably by means of a homogenizer, a nozzle jet disperser, a bead mill, a three-roll mill, a single-shaft or multishaft extruder screw, a kneader and/or a dissolver, preferably by means of a homogenizer, a nozzle jet disperser, a bead mill, a three-roll mill or a dissolver. The dissolver serves primarily for the mixing and preliminary dispersion, and the other units for dispersion of the components. The sequence of addition of the individual solid components is as desired. However, it has been found to be preferable, in the case of use of crosslinkable organic media (C1), to incorporate components (A) and (B) only into component (D), further preferably only into component (C1), even further preferably into component (C1) and (D). Incorporation into components (C1) and (D) allows a higher overall concentration to be achieved.

Particular preference is given to homogenizing the inventive compositions by means of a homogenizer or a three-roll mill Very preferably, the inventive compositions are homogenized by means of a homogenizer.

The dispersion of the microgels (A) in the liquid medium (C) is effected in the homogenizing valve of the homogenizer (see FIG. 1).

In the process used in accordance with the invention, agglomerates are divided into aggregates and/or primary particles. Agglomerates are physically separable units, the dispersion of which does not cause any change in the primary particle size.

FIG. 1 shows how the homogenizing valve works.

The product to be homogenized enters the homogenizing valve at slow speed and is accelerated to high speeds in the homogenizing gap. After the homogenizing gap, the product stream is deflected by 90°. The dispersion is effected beyond the gap principally owing to shear, turbulence and cavitation.

The temperature of the inventive composition on introduction into the homogenizer is appropriately −40 to 140° C., preferably 20 to 80° C.

The inventive composition to be homogenized is appropriately homogenized at a pressure of 20 to 4000 bar, preferably 100 to 4000 bar, preferably 200 to 4000 bar, preferably 200 to 2000 bar, very preferably 500 to 1500 bar, in the unit. The number of passes is guided by the dispersion quality desired, and can vary between one and forty, preferably one to twenty and more preferably one to four passes.

The present invention further provides the compositions obtainable by the process described above.

The invention further relates to the use of the inventive composition for production of polymers which comprise microgels and carbon nanotubes.

When the crosslinkable components used are those components which lead to the formation of thermoplastic polymers, it is found that microgel-containing polymers which behave like thermoplastic elastomers are obtained. The invention thus relates especially also to thermoplastic elastomers which are obtained by the polymerization or crosslinking of the inventive compositions which comprise the component.

The invention also further relates to the polymers or crosslinking products, especially the thermoplastic elastomers, which are obtained by crosslinking or polymerization of the compositions which comprise the microgels and the crosslinkable component, and to the moldings and coatings produced therefrom by customary processes.

The moldings or coatings are produced by shaping or coating using the inventive composition.

The present invention further provides for the use of the inventive composition for production of thermosets which comprise microgels and carbon nanotubes, and organic media, for example unsaturated polyester (UP), melamine-formaldehyde (MF) and phenol-formaldehyde (PF) or epoxy (EP) resins, and also the use of the inventive composition for production of thermosets based on polyurethanes.

Compared to the incorporation of microgels into polymers by extrusion processes, as described, for example, in DE 103 45 043, or the so-called in situ process, in which the rubber particles are crosslinked during the mixing or dispersion process (e.g. U.S. Pat. No. 5,013,793), the inventive compositions allow particularly simple and homogeneous incorporation of microgels into polymers, as a result of which the resulting polymers surprisingly have improved properties.

The invention thus also relates to a process for producing polymer compositions which comprise at least one microgel and at least one carbon nanotube, by polymerizing the inventive composition. More particularly, the process according to the invention comprises the mixing of at least one above-defined organic medium (C), at least one microgel (A) which has not been crosslinked by high-energy rays, and at least one carbon nanotube (B), and optionally the subsequent addition of a crosslinking agent (D) for the crosslinkable medium and the optional subsequent crosslinking or polymerization of the composition. By this process, it is possible to obtain what are known as thermoplastic elastomers, i.e. polymers which, owing to the presence of the microgel phase, behave like elastomers at low temperatures (such as room temperature), but can be processed like thermoplastics at higher temperatures.

In a preferred embodiment of the above process, the organic medium is a crosslinkable organic medium (C1), especially a polyol, more preferably a diol, or a mixture thereof, and the crosslinking agent (D) is a polyisocyanate, preferably a diisocyanate, or a mixture thereof. It is optionally also possible, as known to those skilled in the art, for monofunctional, known as chain terminators, to be present.

The compositions produced in accordance with the invention possess a particularly fine particle distribution, which is achieved particularly with the homogenizer, which is also exceptionally advantageous with regard to the flexibility of the process in terms of varying viscosities of the liquid media and of the resulting compositions and temperatures necessary, and also dispersion quality.

The invention further relates to the use of the inventive compositions for production of molded articles, and to the molded articles obtainable from the inventive compositions. Examples of such molded articles include: plug sockets, damping elements, especially vibration-damping and shock-absorbing elements, acoustic deadening elements, profiles, films, especially damping foils, floor mats, linings, especially shoe insoles, shoes, especially ski boots, shoe soles, electronic components, housings for electronic components, tools, decorative moldings, composite materials, moldings for automobiles, etc.

The present invention further provides for the use of the inventive composition as a rheological additive, for production of moldings and coatings, especially as a thickener or thixotropic agent.

In the case of use for production of moldings and coatings, preference is given to the automotive and damping sectors.

The inventive molded articles can be produced from the inventive compositions by customary processing methods, such as by casting and spraying using 2K systems, melt extrusion, calendering, injection molding (IM), compression molding (CM), and rejection injection molding (RIM), etc.

Some advantages are associated with the inventive composition:

By virtue of the fine dispersion, it is possible to reproducibly establish critical performance properties. The inventive compositions comprising the specific microgels, carbon nanotubes, crosslinkable and/or noncrosslinkable organic media may develop a multitude of new applications of microgels or carbon nanotubes which have not been accessible to date with the microgels or the carbon nanotubes themselves.

For instance, the inventive liquids open up new possible applications, for example casting, spraying, coating, which have the liquid state and defined rheological conditions as a prerequisite.

By polymerization of the inventive compositions comprising crosslinkable organic media, the carbon nanotubes (CNT) and microgel, it is possible, for example, to obtain plastics with completely new properties. The inventive microgel- and CNT-containing compositions may find use in a multitude of fields, for example in elastomeric PU systems (cold-casting systems and hot-casting systems), and also thermally and electrically conductive systems with particular rheological properties.

In the inventive microgel- and CNT-containing compositions, intrinsically incompatible materials surprisingly form a homogeneous distribution which remains stable even in the course of prolonged storage (6 months).

In the inventive compositions, very high structural viscosity or thixotropy is often found. This can be utilized in order to control, as well as other properties, the flow behavior of any desired liquid compositions by the inventive composition. This may be exploited advantageously, for example, in filler-containing compositions which tend to sediment. Unexpected combinations of properties are found in the inventive compositions: for instance, addition of the soft microgel particles to the CNT surprisingly increases or improves hardness, modulus of elasticity E, tensile strain at break $\epsilon B$, tensile stress at break $\sigma B$ and abrasion resistance; moreover, the addition of microgel to the corresponding polyol component comprising CNT fibers examined influences the rheology in an interesting manner:

Adding 5% microgel to the CNT-containing polyol component surprisingly lowers the dynamic viscosity at particular shear rates, even though the solids content is increased. This is desirable in order that the CNT nanofibers can be used in relatively high concentration.

The invention is illustrated in detail by the examples which follow. The invention is of course not restricted to these examples.

EXAMPLE

Hydroxyl-modified SBR-microgel-CNT Combination in RC-PUR KE 8306

RC-PUR KE 8306 is an activated polyol blend for production of PUR in a cold-casting process from Rhein Chemie Rheinau GmbH.

The crosslinking component used is RC-DUR 120, an aromatic polyisocyanate from Rhein Chemie Rheinau GmbH.

OBR 1283 is a crosslinked, surface-modified rubber gel based on SBR. The production of OBR 1283 is described below.

For the tests described below, latex was used, from which the water was removed by spray drying.

Production and characterization of the functionalized microgel OBR 1283 (directly crosslinked microgel)

For the production of the microgel, the following monomers are used: butadiene, styrene, trimethylolpropane trimethacrylate (TMPTMA) and hydroxyethyl methacrylate (HEMA).

Production of OBR 1283:

1.48 g of the sodium salt of a long-chain alkyl sulfonic acid (Mersolat® H 95 from Lanxess Deutschland GmbH) were dissolved in 10.762 kg of water and initially charged in a 40 l autoclave. The autoclave was three times evacuated and charged with nitrogen. Then 4404 g of butadiene, 489 g of styrene, 186 g of trimethylolpropane trimethacrylate (90%), 563 g of hydroxyethyl methacrylate (96%) were added. The reaction mixture was heated to 30° C. while stirring. Subsequently, an aqueous solution consisting of 95 g of water, 950 mg of ethylenediaminetetraacetic acid (Merck-Schuchardt), 760 mg of iron(II) sulfate*7H2O, 1.95 g of Rongalit C (Merck-Schuchardt) and 2.95 g of trisodium phosphate*12H2O was metered in.

The reaction was started by adding 3.15 g of p-menthane hydroperoxide (Trigonox NT 50 from Akzo-Degussa) in 200 g of water, which were rinsed in with 185 g of water. After 2.5 hours of reaction time, the reaction temperature was increased to 40° C. After a further hour of reaction time, reactivation was effected with 350 mg of p-menthane hydroperoxide (Trigonox NT 50) which had been dissolved in an aqueous solution of 25 g of water and 1.25 g of Mersolat K30/95. At this point, the polymerization temperature was increased to 50° C. On attainment of a polymerization conversion of >95%, the polymerization was stopped by adding an aqueous solution of 53 g of diethylhydroxylamine dissolved in 100 g of water. Thereafter, unconverted monomers were removed from the latex by stripping with steam.

The latex was filtered and, as in Example 2 of U.S. Pat. No. 6,399,706 admixed with stabilizer, coagulated and dried.

The gel was characterized both in the latex state by means of ultracentrifugation (diameter and specific surface area) and as a solid product with regard to solubility in toluene (gel content, swelling index/SI), by acidimetric titration (OH number and COOH number) and by means of DSC (glass transition temperature/Tg and range of the Tg stage).

Characteristic data of OBR 1283 are compiled in the following table:

| Micro-gel OBR | Diameter | | | Spec. SA [m²/g] | Gel content [% by wt.] | Swelling index | Tg [° C.] | Range of the Tg stage [° C.] | OH number [mg$_{KOH}$/g$_{Pol.}$] | Acid number [mg$_{KOH}$/g$_{Pol.}$] |
|---|---|---|---|---|---|---|---|---|---|---|
| | d10 [nm] | D50 [nm] | d80 [nm] | | | | | | | |
| 1283 | 39 | 48 | 53 | 135 | 99.4 | 8.8 | −65 | 9.4 | 37.6 | 2.5 |

For the production of the inventive composition, RC-PUR KE 8306 is initially charged; OBR 1283 and the carbon nanotubes are added in the dissolver while stirring. The mixture is left to stand for at least one day, degassed under reduced pressure and then processed further with the homogenizer.

The inventive composition is introduced into the homogenizer at room temperature and passed through the homogenizer three times in batchwise operation at 900 to 1000 bar or 1900 bar (Table 1). In the first pass (1000 bar), the microgel paste is heated to approx. 40° C., in the second pass to approx. 70° C., and in the third pass to approx. 90° C. After cooling, the homogenization is continued until five passes have been attained.

TABLE 1

Composition of the inventive mixtures I to IV based on RC-PUR KE 8306 (figures in % by weight)

| Mixture | RC-PUR KE 8306 | OBR 1283 | Carbon tubes |
|---|---|---|---|
| I | 99.9 | 0 | 0.1 |
| II | 99.4 | 0.5 | 0.1 |
| III | 99.0 | 0 | 1.0 |
| IV | 94.0 | 5.0 | 1.0 |

Thereafter, the inventive composition is reacted with RC-DUR 120 to give a polymer which belongs to the class of the cold-cast elastomers (PUR-E).

The Shore hardnesses of the mixture are shown in Tab. 2.

TABLE 2

Shore hardnesses of the inventive mixtures I to IV based on RC-PUR KE 8306.

| Mixing/homogenization | Shore A | Shore D |
|---|---|---|
| I<br>5 * 1000 bar | 98 | 82 |
| II<br>5 * 1000 bar | 98 | 84 |
| III<br>5 * 1900 bar | 98 | 76 |
| IV<br>5 * 1900 bar | 98 | 80 |

The addition of microgel to RC-PUR KE 8306 has no influence on Shore A; Shore D is surprisingly increased by the addition of the soft microgel.

The results of the tensile strain test on the inventive mixtures are shown in Tab. 3.

TABLE 3

Maximum moduli of elasticity E, tensile strains at break $\epsilon_B$ and tensile stresses at break $\sigma_B$ of the inventive mixtures I to IV based on RC-PUR KE 8306.

| Mixture No. | Composition Homogenization | Moduli of elasticity E [N/mm²] | Tensile strain at break $\epsilon_B$ [%] | Tensile stress at break $\sigma_B$ [MPa] |
|---|---|---|---|---|
| I | 0.1% CNT<br>5 * 1000 bar | 1800 | 9 | 44 |
| II | 0.1% CNT,<br>0.5% OBR 1283<br>5 * 1000 bar | 1943 | 12 | 46 |
| III | 1% CNT<br>5 * 1900 bar | 1275 | 6 | 36 |
| IV | 1% CNT,<br>5% OBR 1283<br>5 * 1900 bar | 2086 | 8 | 40 |

It is evident from Tab. 3 that the addition of microgel to the CNT fibers increases the measured modulus of elasticity E, the tensile strain at break $\epsilon_B$ and the tensile stress at break $\sigma_B$.

This is surprising since addition of a soft microgel particle would be expected to decrease the modulus of elasticity Emax, the tensile strain at break $\epsilon_B$ and the tensile stress at break $\sigma_B$.

The abrasion of the inventive mixtures was determined to DIN 53516 (Tab. 4).

TABLE 4

Abrasion to DIN 53516 of the inventive mixtures I to IV based on RC-PUR KE 8306.

| Sample | Abrasion [mm³] |
|---|---|
| I<br>0.1% CNT<br>5 * 1000 bar | 369 |
| II<br>0.1% CNT – 0.5% OBR 1283<br>5 * 1000 bar | 330 |
| III<br>1% CNT<br>5 * 1900 bar | 372 |
| IV<br>1% CNT – 5% OBR 1283<br>5 * 1900 bar | 322 |

The abrasion is also surprisingly reduced by the addition of the soft nanoparticles to the CNT-containing, hard cold-cast elastomer.

In summary, it can be stated that addition of the soft nanoparticles, OBR 1283, to the CNT-containing, hard cold-cast elastomer RC-PUR KE 8306 surprisingly increases or improves hardness, modulus of elasticity E, tensile strain at break $\epsilon_B$, tensile stress at break $\sigma_B$ and abrasion resistance.

Shore A hardness is measured based on DIN 53505, the tensile properties based on EN ISO 527-1 (S2 standard specimens prepared according to DIN 53504) and abrasion based on DIN 53516 at room temperature (RT) (approx. 23° C.).

In addition, rheological studies were undertaken on the inventive compositions, in order to determine the influence of the microgel on the rheology of the CNT-containing cold-cast elastomer-polyol component (Tab. 5).

TABLE 5

Viscosities of the inventive mixtures I to IV based on RC-PUR KE 8306 as a function of shear rate at 20° C.; MCR 300.

| Material/concentration | Degree of dispersion | Shear rate $\gamma = 0.2\ s^{-1}$ [Pa * s] | Shear rate $\gamma = 5\ s^{-1}$ [Pa * s] | Shear rate $\gamma = 100\ s^{-1}$ [Pa * s] | Shear rate $\gamma = 1000\ s^{-1}$ [Pa * s] |
|---|---|---|---|---|---|
| CNT mixture 0.1% | 5 × 1000 bar | 1.9 | 1.9 | 1.8 | 1.7 |

TABLE 5-continued

Viscosities of the inventive mixtures I to IV based on RC-PUR KE 8306 as a function of shear rate at 20° C.; MCR 300.

| Material/concentration | Degree of dispersion | Shear rate $\gamma = 0.2\ s^{-1}$ [Pa * s] | Shear rate $\gamma = 5\ s^{-1}$ [Pa * s] | Shear rate $\gamma = 100\ s^{-1}$ [Pa * s] | Shear rate $\gamma = 1000\ s^{-1}$ [Pa * s] |
|---|---|---|---|---|---|
| CNT mixture 0.1% + 0.5% OBR 1283 | 5 × 1000 bar | 2.0 | 2.0 | 1.9 | 1.8 |
| CNT mixture 1% | 5 × 1900 bar | 396 | 51 | 7.4 | 3.3 |
| CNT mixture 1% + 5% OBR 1283 | 5 × 1900 bar | 117 | 36 | 7.1 | 3.7 |

In the compositions with a CNT content of 0.1% based on the polyol component, barely any influence of the shear rate or of the microgel content on the dynamic viscosity is observed.

It is clear from Tab. 5 that the addition of microgel to the polyol component which contains one percent of CNT fibers influences the rheology in an interesting manner: the polyol component containing 1% CNT exhibits a very high viscosity (396 Pas) at low shear rate. A low viscosity is desirable in order that the CNT nanofibers can be used in relatively high concentration.

Addition of 5% microgel to the CNT-containing polyol component RC-PUR KE 8306 surprisingly lowers the dynamic viscosity at shear rates $\gamma$ of $0.2\ s^{-1}$, $5\ s^{-1}$ and $100\ s^{-1}$, even though the solids content is increased.

Only at the very high shear rate $\gamma$ of $1000\ s^{-1}$ is the influence of the increased solids content observed.

The invention claimed is:

1. A composition comprising at least one microgel (A), at least one carbon nanotube (B) and at least one organic medium (C).

2. The composition as claimed in claim 1, wherein the at least one organic medium is crosslinkable or uncrosslinkable.

3. The composition as claimed in claim 1, wherein the component (C) is a crosslinkable organic medium and the composition additionally comprises a crosslinking agent (D).

4. The composition as claimed in claim 1, wherein the weight ratio of the at least one microgel (A) to the at least one carbon nanotube (B) is 0.1:99 to 99:0.1.

5. The composition as claimed in claim 1, wherein the primary particles of the carbon nanotubes (B) have a diameter of 3 to 100 nm and a length of 50 nm to 100 μm.

6. The composition as claimed in claim 1, wherein the at least one carbon nanotube (B) is unmodified.

7. The composition as claimed in claim 1, wherein the at least one carbon nanotube (B) has been modified.

8. The composition as claimed in claim 7, wherein the at least one carbon nanotube (B) has been modified by at least one functional group selected from the group consisting of hydroxyl, carboxyl and amine groups.

9. The composition as claimed in claim 1, wherein the at least one carbon nanotube (B) is unreactive toward the organic medium (C).

10. The composition as claimed in claim 1, wherein the at least one carbon nanotube (B) is reactive toward the organic medium (C).

11. The composition as claimed in claim 1, wherein the microgel (A) is based on rubber.

12. A process for producing a composition as claimed in claim 1, wherein the at least one microgel (A), at least one carbon nanotube (B) and at least one organic medium (C) are mixed and/or dispersed by means of a homogenizer, a nozzle jet disperser, a bead mill, a three-roll mill, a single-shaft or multishaft extruder screw, a kneader and/or a dissolver.

13. A process for the preparation of polymers comprising at least one microgel and at least one carbon nanotube which comprises the step of polymerizing the composition as claimed in claim 1.

14. A process for the production of moldings and coatings comprising the step of processing the composition as claimed in claim 1.

15. A process for the production of rheological additives comprising the step of employing the composition as claimed in claim 1.

16. The process according to claim 14, wherein the moldings and coatings are moldings and coatings in the automotive and damping sectors.

17. A composition comprising at least one microgel (A), at least one carbon nanotube (B) and at least one organic medium (C), wherein the at least one organic medium (C) is crosslinkable and selected from the group consisting of polyols, polyetherpolyols, polyether diols, polyester diols, polyetherester diols, polyhexamethylene carbonate diols, diisocyanates, and polyisocyanate prepolymers.

* * * * *